(12) United States Patent
Piersol

(10) Patent No.: US 7,143,142 B1
(45) Date of Patent: Nov. 28, 2006

(54) METHOD AND APPARATUS FOR APPLIANCE HOST SUPPORTED NETWORK-BASED APPLICATION DELIVERY

(75) Inventor: Kurt W. Piersol, Santa Cruz, CA (US)

(73) Assignee: Ricoh Co., Ltd., Tokyo (JP)

( * ) Notice: Subject to any disclaimer, the term of this patent is extended or adjusted under 35 U.S.C. 154(b) by 0 days.

(21) Appl. No.: 09/570,989

(22) Filed: May 15, 2000

(51) Int. Cl.
*G06F 15/16* (2006.01)
*G06F 17/60* (2006.01)

(52) U.S. Cl. .................. 709/217; 709/227; 709/219; 705/26; 705/52

(58) Field of Classification Search ................ 705/217, 705/52, 26; 709/217, 227, 219
See application file for complete search history.

(56) References Cited

U.S. PATENT DOCUMENTS

| | | | | |
|---|---|---|---|---|
| 5,638,513 A | * | 6/1997 | Ananda | 713/202 |
| 5,867,153 A | * | 2/1999 | Grandcolas et al. | 705/39 |
| 5,889,942 A | * | 3/1999 | Orenshteyn | 713/201 |
| 6,157,917 A | * | 12/2000 | Barber | 705/26 |
| 6,334,118 B1 | * | 12/2001 | Benson | 705/52 |
| 6,418,463 B1 | * | 7/2002 | Blevins | 709/202 |

* cited by examiner

*Primary Examiner*—Ario Etienne
*Assistant Examiner*—Sahera Halim
(74) *Attorney, Agent, or Firm*—Blakely, Sokoloff, Taylor & Zafman LLP

(57) ABSTRACT

A method and apparatus for appliance host supported network-based application delivery is described. In one embodiment, a local client device requests access to a network-based application for use with data stored locally by the client. In one embodiment, an appliance host retrieves the network-based application from a remote server based upon the client request and negotiated access terms. In one embodiment, the appliance host operates much like a cache in that rather than automatically retrieving the client-requested network-based application from a remote server, the appliance host first determines if a local copy of the application is stored on the appliance host. If the network-based application is stored on the appliance host, whether preinstalled by the vendor or remaining from a previous client request, then the appliance host executes the locally stored version of the application rather than retrieving a copy from the remote server. Since the network-based application is executed locally (with respect to the client) rather than at the remote server location, any communication interruptions that may occur outside the local network will not affect execution of the network-based application.

32 Claims, 7 Drawing Sheets

METHOD AND APPARATUS FOR APPLIANCE HOST SUPPORTED NETWORK-BASED APPLICATION DELIVERY

FIELD OF THE INVENTION

The invention relates to network-based data processing. More specifically, the invention relates to support of application programs by an appliance host.

BACKGROUND OF THE INVENTION

Network-based data processing often involves the use of computer systems organized in a client-server arrangement. In a typical client-server arrangement, network-based applications including programs, Java applets and ActiveX controls, for example, may be supplied to one or more client devices by a remote server device on a shared network.

The shared network may include an internal private network such as an Intranet or local area network (LAN), an external public network, such as the Internet, or a combination of the two. Within shared networks, clients and servers are often controlled and/or managed by different entities or organizations. For a variety of security reasons, the operator of a client system may not wish to send sensitive data across a non-secure network (i.e. that controlled by a different organization) to be processed by an application residing on a remote server. In many situations, the operator of the client device will prefer to execute the application locally such that sensitive data is not compromised.

Furthermore, even though network-based applications stored on a remote server may be executable by a local client, there is no guarantee that the network connection will not be lost or incur communication problems during application execution. Even if precautions are taken by one organization to ensure operational redundancy within a local network, there is no guarantee that external data communication links between the local network and the remote server will not fail or experience communication problems. If a user requires a mission-critical application but is unable to access the application due to external communication problems, user satisfaction will suffer.

Further yet, even if network connectivity could be guaranteed, the amount of application code that would be required to be downloaded to the client upon each execution request is formidable. For example, a full version of an application such as Microsoft Word®, can take hours to transmit over even the fastest network connections. If prior to every execution, the requested application had to be downloaded from a remote server, the required download time coupled with external communications delays may approach an intolerable level.

Lastly, suppliers of network-based applications may provide multiple versions of an application depending on the system upon which the application is to run. For example, a complete version of the application may be intended for systems having 32 or more Mbytes of memory and a more functionally limited version of the application may be intended for a system having less than 32 Mbytes of memory. Additionally, versions of an application may be designed to operate on specific hardware platforms (e.g., Pentium® II processor, Pentium® III processor, PowerPC® processor) utilizing, for example, a variety of instruction sets. It would be very difficult for an external organization maintaining a remote applications server to track more than a few static client configurations let alone the tens of thousands of configuration variations possible due to available hardware and/or software upgrades.

Therefore, what is needed is an improved technique for providing network-based applications.

SUMMARY OF THE INVENTION

A method and apparatus for appliance host supported network-based application delivery is described. One or more access terms are negotiated for a client device to access a network-based application stored upon an appliance host device with usage of the network-based application to be leased from a remote application server. Client access to the network-based application is enabled as the network-based application is executed by the appliance host device based upon the negotiated one or more access terms.

BRIEF DESCRIPTION OF THE DRAWINGS

The invention is illustrated by way of example, and not by way of limitation in the figures of the accompanying drawings in which like reference numerals refer to similar elements.

DETAILED DESCRIPTION

Figure 1:
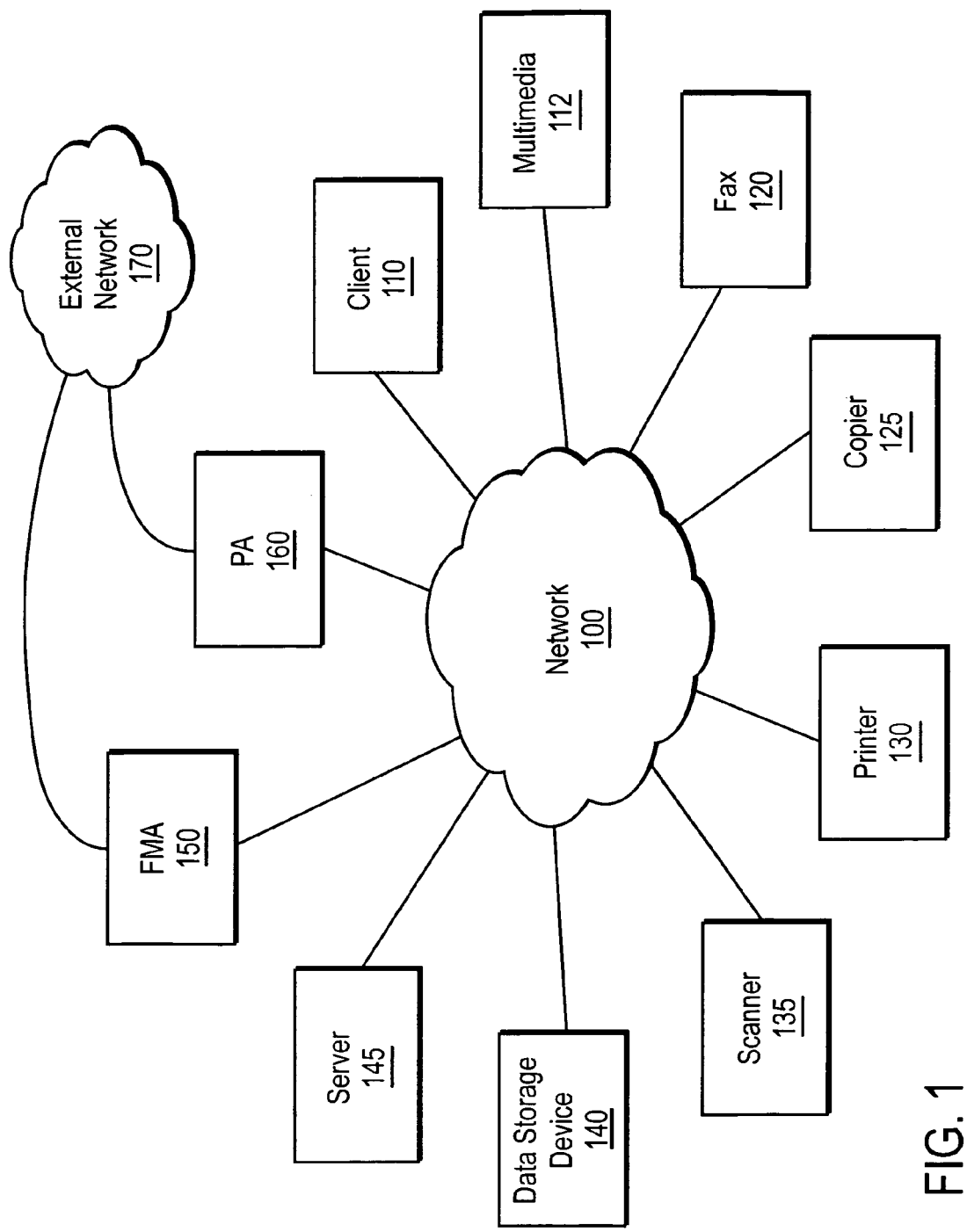
FIG. 1 illustrates one embodiment of a networked system containing an FMA.

A method and apparatus for appliance host supported network-based application delivery is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the invention is not described with reference to any particular programming language. It will be appreciated that a variety of programming languages may be used to implement the teachings of the invention as described herein.

FMA Overview

A file management appliance ("FMA") is a device that utilizes multiple processes and queues to provide document capture and indexing services to a network. In one embodiment, the FMA device is implemented as a thin server utilizing a pared-down UNIX based operating system. In another embodiment, the FMA provides to users a web-based interface to a set of documents captured through a variety of sources. In yet another embodiment, the FMA utilizes web-based common gateway interface (CGI) scripting to provide standardized user input and display. To the end-user, the FMA appears as a search engine for their local network. To other devices on a shared network, the FMA is an appliance that enables document capture using standard Internet protocols.

The FMA may be a networked office appliance (NOA) and may be part of a networked office appliance architecture. Both the networked office appliance and supporting architecture are described in copending nonprovisional application Ser. No. 09/191,277, filed Nov. 12, 1998 and entitled "Method and Apparatus for Automatic Network Configurations," assigned to the corporate assignee of the present application and incorporated herein by reference.

Briefly, in one embodiment, a NOA architecture enables appliances to be added to a network without requiring configuration or setup in offices or environments lacking a network administrator. At the same time, a NOA architecture enables appliances to be easily added to standard administered networks without causing conflicts with preexisting network devices. Furthermore, NOAs work closely together in networked environments and are able to automatically detect and share information with one another upon being connected to a network.

A NOA architecture provides mechanisms for automatically configuring devices on networks, such as, for example, TCP/IP networks. Specific configuration methods that may be provided include network address allocation, Domain Name Service (DNS) database population, network service discovery, and user identity sharing. Devices that follow these algorithms automatically start DHCP and DNS services when they are not already present on a network, and refrain from doing so if such services are already present on a network. Both DHCP and DNS services work together to provide names and addresses to network devices on the same network without human intervention (i.e. automatically). In addition, a hypertext transfer protocol (HTTP) based method of securely sharing service information as well as user and group information is defined.

By being a NOA device, the FMA is able to provide configuration services, including DHCP and DNS, as well as providing user and group lists to a network when needed. The FMA is also able to provide an HTTP based common interface with other NOA devices. Once the FMA is connected to a network, the FMA detects NOA backup devices and systematically announces and/or publishes its presence to other NOA devices.

FIG. 1 illustrates a block diagram of one embodiment of a networked system containing an FMA. Referring to FIG. 1, client 110 represents a general purpose digital computer connected to network 100 and equipped to execute a wide variety of application programs including graphical web browsers, electronic mail applications, word processing and spreadsheet applications and the like. Network 100 may represent a local network such as a LAN, or an intranet, but network 100 may also represent any network of interconnected devices. Also connected to network 100 is multimedia source 112, facsimile machine 120, copier 125, printer 130, scanner 135, data storage device 140, server 145, portal appliance ("PA") 160, and FMA 150. In one embodiment, both FMA 150 and PA 160 are coupled to both network 100 and external network 170. In one embodiment, external network 170 represents the Internet, however, external network 170 can represent any network of electronic devices. It should be apparent that although numerous devices are shown connected to network 100, a greater or fewer number of devices may similarly be connected without departing from the spirit and scope of the invention.

Multimedia source 112 represents one or more audio and video input devices connected to network 100. Multimedia source 112 may represent one or more microphones and/or video cameras that may provide both analog and digital data to network 100.

Facsimile machine 120 is connected to network 100 and represents a device capable of transmitting and receiving data such as text and images over a telephone line ("faxing"). In one embodiment, facsimile machine 120 may transmit text and images originating in printed form, or in another embodiment, facsimile machine 120 may transmit electronic data originating from any number of devices connected to network 100. Similarly, in one embodiment, facsimile machine 120 may print a hard copy of the received data, or in another embodiment, facsimile machine 120 may forward the received data to any number of devices connected to network 100.

Copier 125 represents a device capable of reproducing text and images. In one embodiment, copier 125 is a photocopier that reproduces printed text and images, whereas in another embodiment copier 125 is a photocopier that reproduces data received from any number of devices connected to network 100.

Printer 130 represents a device capable of converting electronic data into printed text and images, whereas scanner 135 represents a device capable of converting printed text and images into electronic data. In one embodiment, facsimile machine 120, photocopier 125, printer 130, and scanner 135 are each separate and distinct devices connected to network 100. In another embodiment, a multifunction peripheral device may replace any combination of these devices.

FIG. 1 also depicts data storage device 140 connected to network 100. In one embodiment, data storage device 140 represents a removable storage medium such as, for example, a CD-ROM, DVD-ROM, DVD-RAM, DVD-RW, or magnetic tape. In an alternative embodiment, data storage device 140 represents a non-removable storage medium such as a hard or fixed disk drive. In one embodiment, data storage device 140 is a NOA archiving device.

Server 145 represents a general purpose digital computer connected to network 100 and is configured to provide network services to devices connected to network 100. In one embodiment, server 145 provides file sharing and printer services to network 100. In another embodiment, server 145 is a Web server that provides requested hypertext markup language (HTML) pages or files over network 100 to requesting devices. In yet another embodiment, server 145 is a NOA server capable of providing configuration services to network 100.

In one embodiment, FMA 150 is equipped to operate as an appliance host to facilitate network-based application delivery and provide a run-time platform for one or more clients connected to a local network such network 100. In one embodiment, FMA 150 provides document capture services, configuration services and indexing services to network 100 and/or network 170. In a further embodiment, FMA 150 is a NOA device equipped to publish its presence to other NOA devices on network 100 and/or 170 using the HTTP protocol.

Document capture (to be discussed more fully below) is the process by which one device requests an archiving device, such as data storage device 140, to archive a document. Unconscious capture is a term used to describe document capture that occurs transparently with respect to the user. In one embodiment, document capture is performed using standard Internet protocols. In one embodiment, the requesting device and the archiving device are both NOA devices. In another embodiment, FMA 150 is the requesting device.

In the FMA environment, a document may comprise a single file. In one embodiment, the term document is used synonymously with the term "document directory" to represent these documents. A document may be composed of many distinct files of varying types, each representing at least the partial content of the document. A print job created on client 110 and intended for printer 130 could be captured, for example, as a thumbnail image, a postscript file, a portable document format (PDF) file, and an ASCII file containing extracted text. Additionally, FMA 150 is equipped to process multiple image file formats such as, for example, the joint photographic experts group format (JPEG), graphics interchange format (GIF), and tagged image file format (TIFF) to name just a few. In one embodiment, each unique file type is represented by a corresponding unique file extension appended to the file's name. For example, a portable document format file may be represented as: filename.pdf, whereas a thumbnail image may be represented as: filename.thumb. In one embodiment, FMA 150 is equipped to interpret compound filename extensions. A file that contains thumbnail images in a tagged image file format, for example, may be represented as filename.thumb.tiff. In one embodiment, FMA 150 uses document page numbers as the filename. Accordingly, a document may be represented by multiple files located in the same directory, each representing a different page of the document as reflected by the filename. For example, 01.thumb.jpg would represent a thumbnail image of page number one in joint photographic experts group format. Similarly, 12.thumb.tiff would represent a thumbnail image of page number twelve in tagged image file format.

Referring back to FIG. 1, FMA 150 can index data captured from various devices connected to, for example, network 100 including printer 130, facsimile machine 120, client 110, and scanner 135. In one embodiment, facsimile machine 120 captures data over a telephone line and subsequently sends at least part of the received data to FMA 150 over network 100. In another embodiment, data sent from client 110 to facsimile machine 120 over network 100 is transparently (e.g., unbeknownst to the device) captured and at least part of the data is routed to FMA 150 for indexing. In an alternative embodiment, facsimile machine 120 is located internal to client 110 thereby eliminating the need for client 110 to send data over network 100. In such an embodiment, FMA 150 nonetheless receives at least part of the captured data. In one embodiment, FMA 150 receives bibliographic-type data, or "metadata" extracted from the document. In one embodiment, data received from facsimile machine 120 is composed in TIFF format, whereas data received from client 110 may retain its original format upon transfer.

The FMA capture process similarly applies to other devices connected to network 100 such as scanner 135 and copier 125. In one embodiment, if optical character recognition ("OCR") is performed on a scanned or copied document, FMA 150 creates two special OCR-related files. In one embodiment, contents.txt and contents.pdf are created and used by FMA 150 to index the full text of the document and return page images as a document file respectively.

PA 160 is also coupled to both network 100 and network 170. In one embodiment, PA 160 supports searches of captured (or internal) documents stored, for example, on data storage device 140 as well as external (or public) documents available from network 170. In an alternative embodiment, the functionality of PA 160 is incorporated into FMA 150 or another device (e.g., client 110, server 145) coupled to network 100.

Unconscious Capture

Unconscious capture is an operation in which a device (e.g., FMA 150) requests an archiving device (e.g., data storage device 140) to archive a document in a manner that is transparent to users. In general, unconscious capture refers to FMA 150, or another device, automatically capturing documents processed by network 100 or devices coupled to network 100 without user intervention. In one embodiment, a user can optionally prevent capture of one or more documents or modify which documents are automatically captured.

Unconscious capture can be performed by any network entity or device. In one embodiment, unconscious capture utilizes standard Internet protocols and allows the capture of multiple files associated with a single document. In another embodiment, simultaneous capture of multiple documents is supported.

In one embodiment, a document is represented by a directory containing one metadata file and at least one data file. The actual name of the document directory is not important during unconscious capture as the name of the document is not stored as part of the directory system, but is instead stored within the metadata file. In one embodiment, the name of the document is stored in the metadata file using a document serial number and the capture date is used for the name of the document directory.

In one embodiment, the capture protocol is an implementation of the Internet File Transfer Protocol (FTP). In one embodiment, documents are captured either as multipurpose Internet mail extension (MIME) files in the default FTP directory, or as subdirectories of the default directory. Other capture formats can also be used.

Figure 2A:
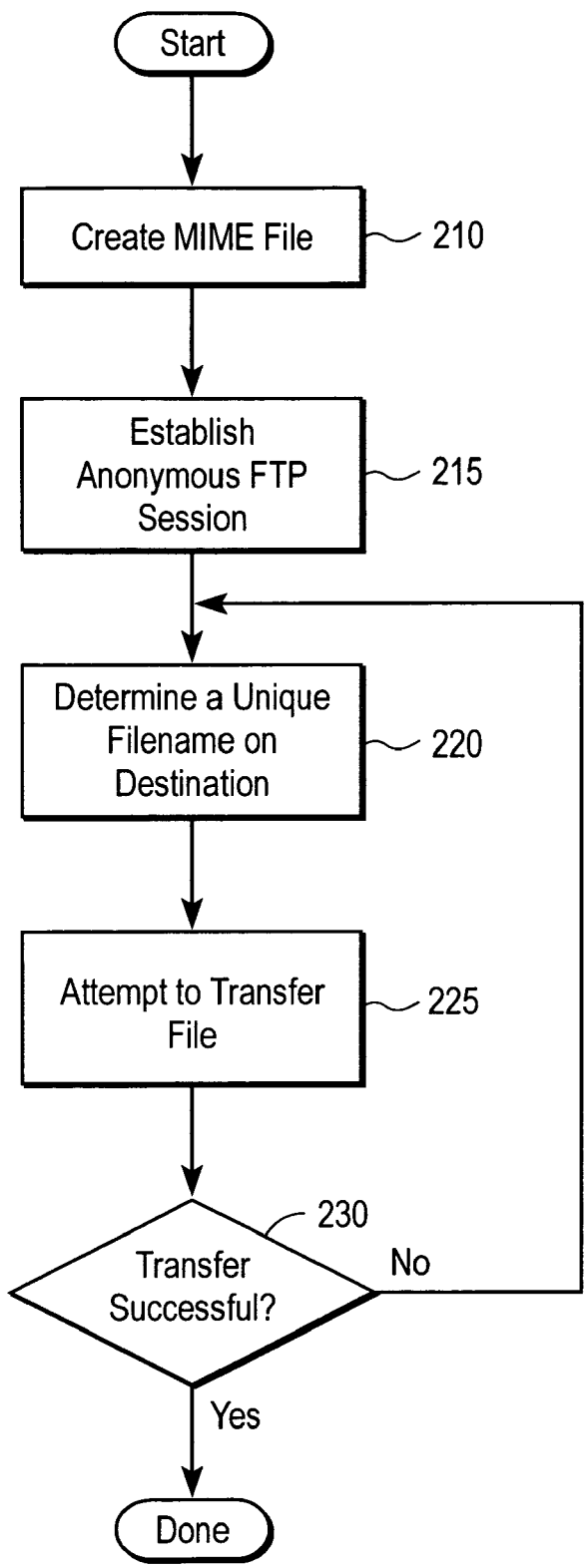
FIG. 2A is a flow diagram illustrating one embodiment of MIME capturing in an FMA environment.

FIG. 2A illustrates one embodiment of unconscious capture using the MIME format. A capturing device creates a MIME multi-part file, including all content files and a metadata file, 210. The capturing device then attempts to establish an anonymous FTP session with the destination device, 215. Once an FTP session is established, the capturing device determines a filename that is a unique on the destination device, 220 and attempts to transfer the file to the destination device, 225. If the transfer fails, the capturing device obtains a new filename and attempts the file transfer again. The capture is complete upon a successful file transfer, 230.

Figure 2B:
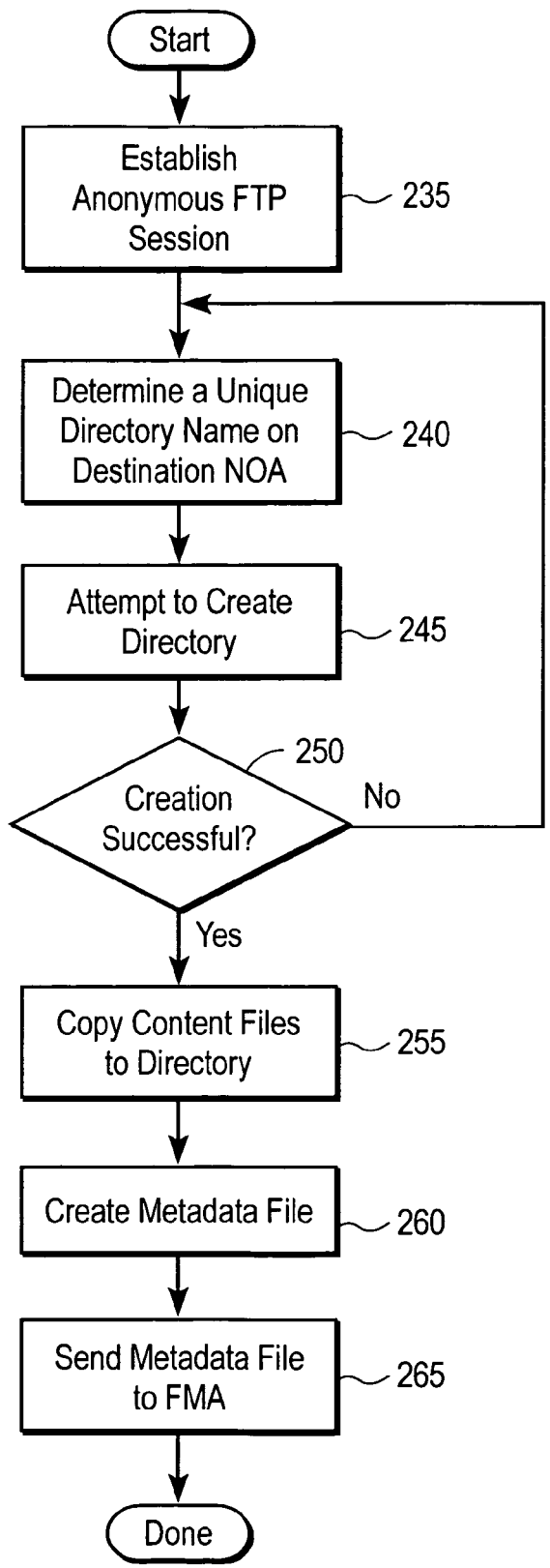
FIG. 2B is a flow diagram illustrating one embodiment of directory capturing in an FMA environment.

FIG. 2B illustrates one embodiment of unconscious capture in an FMA environment. The capturing device establishes an anonymous FTP session with the destination device, 235. Once the FTP session is established, the capturing device determines what it assumes to be a unique directory name on the destination device, 240. Once a directory name is determined, the capturing device attempts to create a directory with that name on the destination device, 245. If the attempt to create the directory is unsuccessful, whether due to a duplicate directory name or otherwise, the capturing device determines another directory name and attempts to create the directory again.

If, however, the capturing device successfully creates the directory on the destination device, 250, the capturing device then copies the content file or files to the newly created directory, 255. The capturing device also creates a metadata file, 260, which is then sent to the FMA device, 265 to complete the process.

Figure 2C:
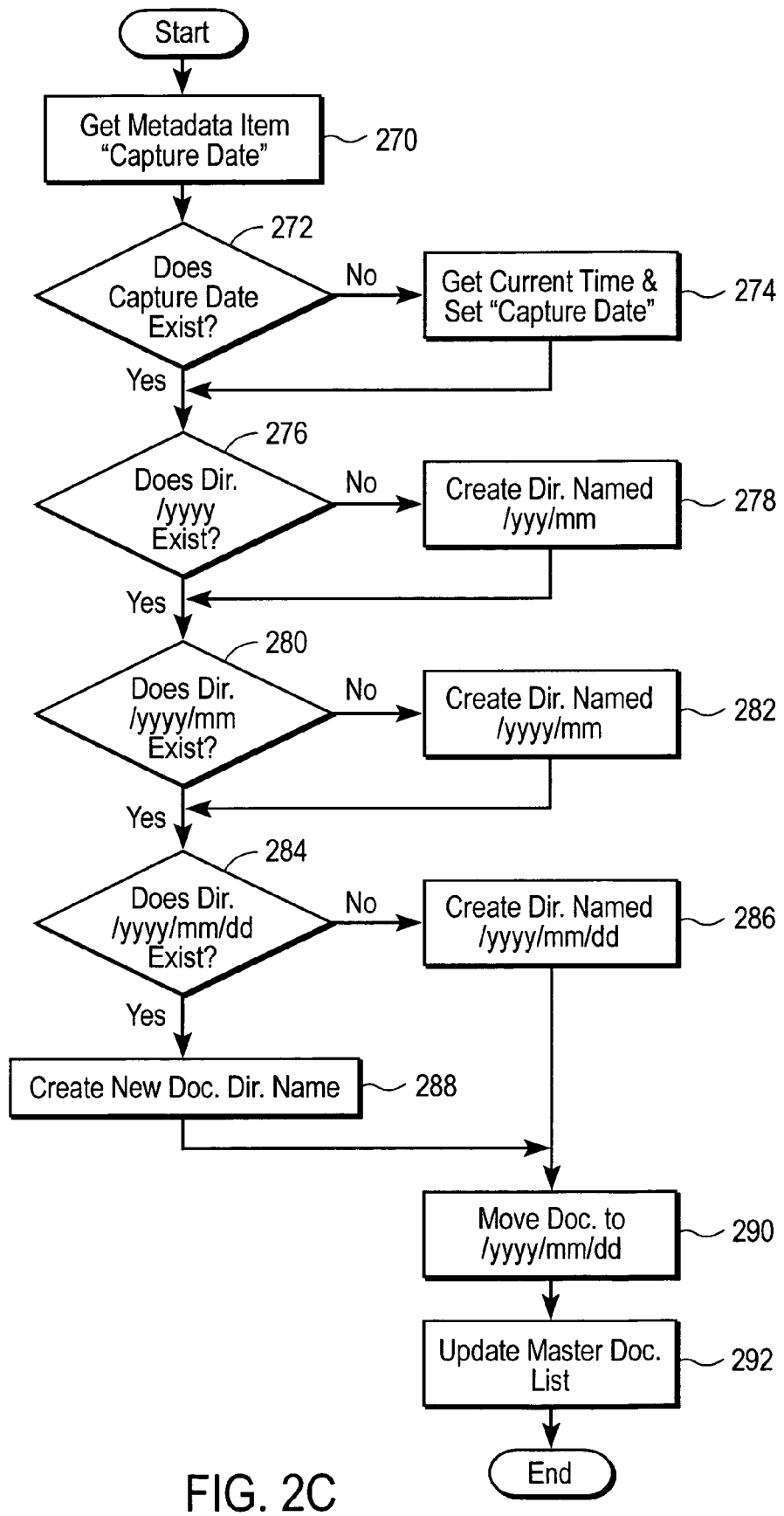
FIG. 2C is a flow diagram illustrating one embodiment of the document storage process in an FMA environment.

FIG. 2C illustrates one embodiment of the document storage process in a FMA environment. In one embodiment the document directory is represented by "yyyy/mm/dd" where yyyy represents the year in which the document was created, mm represents the ordinal month in which the document was created, and dd represents the day of the month in which the document was created. Other date formats and/or storage ordering can also be used.

During the document storage process, the FMA creates appropriate directories, moves the document to the appropriate directory, and updates the master list. The metadata file of the document to be stored is accessed and information from its "Capture date" field is retrieved, 270. If the document's "Capture date" or even the metadata file does not exist, then the current system time is obtained and used as the document's "Capture date," 274. If, however, the document's "Capture date" does exist, the system determines whether an appropriately named directory exists.

The system determines whether a directory exists as reflected by the appropriate year, 276. If a directory reflecting the appropriate year does not exist, the system creates such a directory, 278. If a directory reflecting the appropriate year does exist, the system then checks whether a directory reflecting the appropriate month exists within that year directory, 280. If the appropriate month directory does not exist within the year directory, the system creates a month directory within the year directory, 282. If the appropriate year and month directories exist, the system finally checks whether the appropriate day directory exists within the nested year/month directory, 284. If the day directory does not exist, the system creates the appropriate day directory within the year/month directory, 286. If a directory reflecting the appropriate year, month and day already exists, the system creates a new document directory name into which the document will be stored. In one embodiment, the system generates a four-digit random number that gets appended to the end of the existing document directory name, 288. Once a unique document directory name is established, 286 and 288, the document is moved to that directory, 290 and the master document list is updated to reflect the document's new location, 292.

Overview of an Appliance Host

Figure 3:
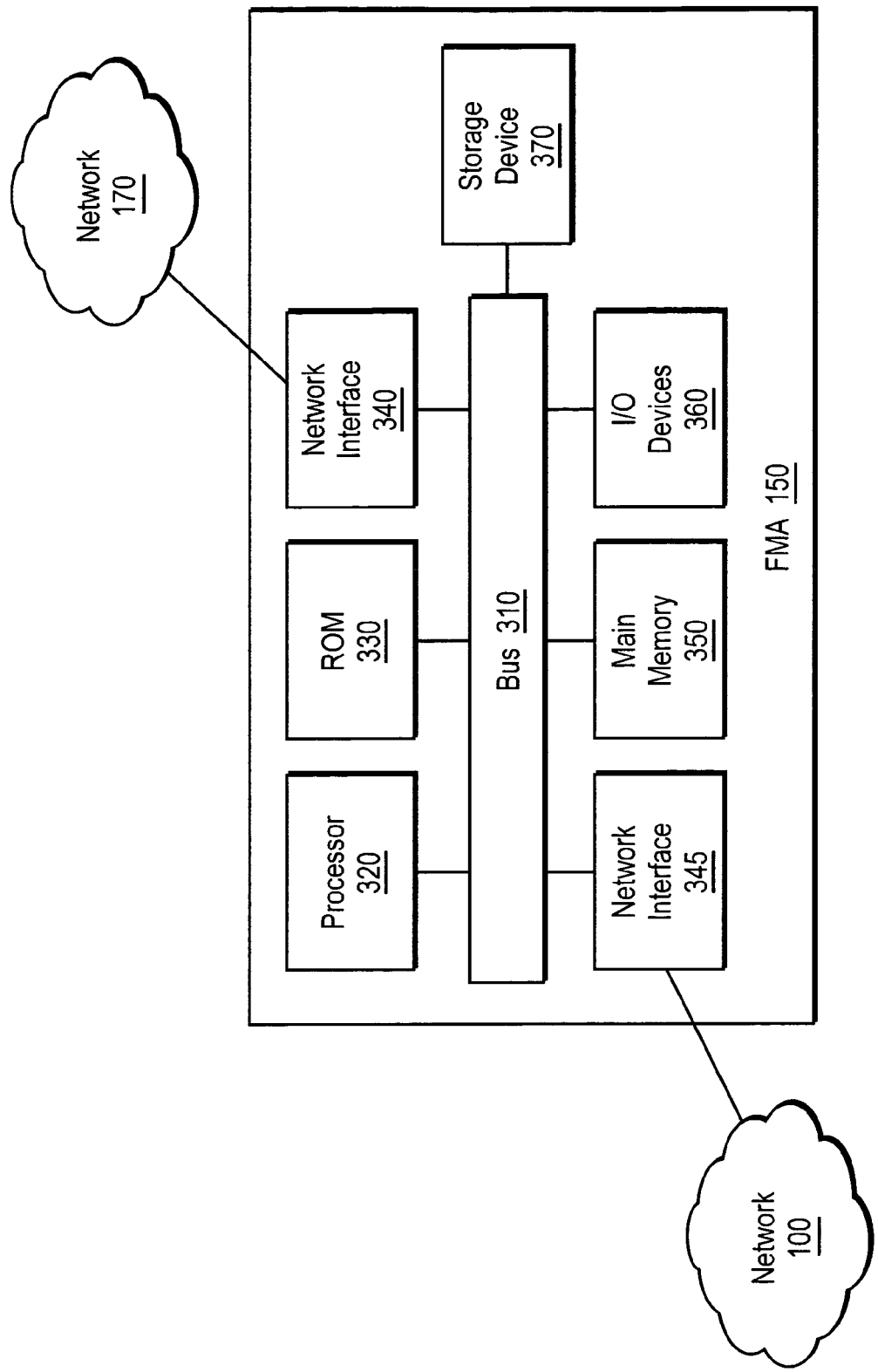
FIG. 3 is a block diagram illustrating one embodiment of an FMA hardware implementation.

An appliance host as described herein refers to any network appliance equipped to operate as a host for network-based applications, including for example, a network office appliance (NOA) and/or a file management appliance (FMA). FIG. 3 is a block diagram illustrating one embodiment of FMA 150 as an appliance host. FMA 150 includes bus 310 to communicate information, and processor 320 coupled to bus 310 to process information. While FMA 150 is illustrated having a single processor, FMA 150 can include multiple processors and/or co-processors. FMA 150 further includes main memory 350 which represents random access memory (RAM) or similarly equipped dynamic storage device. Main memory 350 is coupled to bus 310 to store information and instructions to be executed by processor 320. Main memory 350 can also be used to store temporary variables or other intermediate information during execution of instructions by processor 320.

FMA 150 also includes read only memory (ROM) 330 which represents a static storage device coupled to bus 310 to store static information and instructions for processor 320. Storage device 370 is coupled to bus 310 to store large amounts of information and instructions for an extended period of time. In one embodiment, storage device 370 stores one or more application programs received from a remote server. Storage device 370 can represent, for example, a magnetic disk or optical disc coupled to FMA 150.

FMA 150 can also be coupled to I/O devices 360 via bus 310. I/O devices 360 represent a group of devices, such as a cathode ray tube (CRT) or liquid crystal display (LCD), to display information to a user, and I/O devices 360 represent both alphanumeric and cursor-based input devices used to communicate information and command selections to processor 320. Additional and/or different I/O devices can also be coupled to bus 310.

Network interface 340 provides an interface between FMA 150 and network 170. Similarly, network interface 345 provides an interface between FMA 150 and network 100. In one embodiment, network interface 340 and network interface 345 are network interface cards (NICs), which are known in the art; however, any interface that can provide FMA 150 with access to multiple networks can be used.

In one embodiment, FMA 150 is used to facilitate network-based application delivery and execution for one or more clients connected to a local network such network 100. According to one embodiment, FMA 150 facilitates such network-based application delivery and execution in response to processor 320 executing sequences of instructions contained in main memory 350. Instructions are provided to main memory 350 from a storage device, such as magnetic disk, a read-only memory (ROM) integrated circuit (IC), CD-ROM, DVD, via a remote connection (e.g., over a network), etc. In alternative embodiments, hard-wired circuitry can be used in place of or in combination with software instructions to implement these operations. Thus, the disclosed functionality is not limited to any specific combination of hardware circuitry and software instructions.

Network-Based Application Delivery

Prior art implementations of network-based application delivery are limited to repeated application delivery from a remote server to a client independent of whether the application has been previously delivered to a requesting client device. Likewise, prior art implementations of application delivery unnecessarily rely upon external public networks for subsequent delivery of a previously delivered application.

In one embodiment, an intermediate network appliance host is logically disposed between a local client device and a remote server device to facilitate network-based application delivery and overcomes limitations found within the prior art.

In one embodiment, a local client device requests access to a network-based application for use with data stored locally by the client. An appliance host retrieves the network-based application from a remote server based upon the client request and negotiated access terms. In one embodiment, the appliance host operates much like a cache in that rather than automatically retrieving the client-requested network-based application from a remote server, the appliance host first determines if a local copy of the application is stored on the appliance host. If the network-based application is stored on the appliance host (whether pre-installed by the vendor or remaining from a previous client request), then the appliance host executes the locally stored version of the application rather than retrieving a copy from the remote server. Since the network-based application is executed locally (with respect to the client) rather than at the remote server location, any communication interruptions that may occur outside the local network will not affect execution of the network-based application. Likewise, because client data is not transported outside of the local network, greater data security and/or integrity is achieved.

Figure 4:
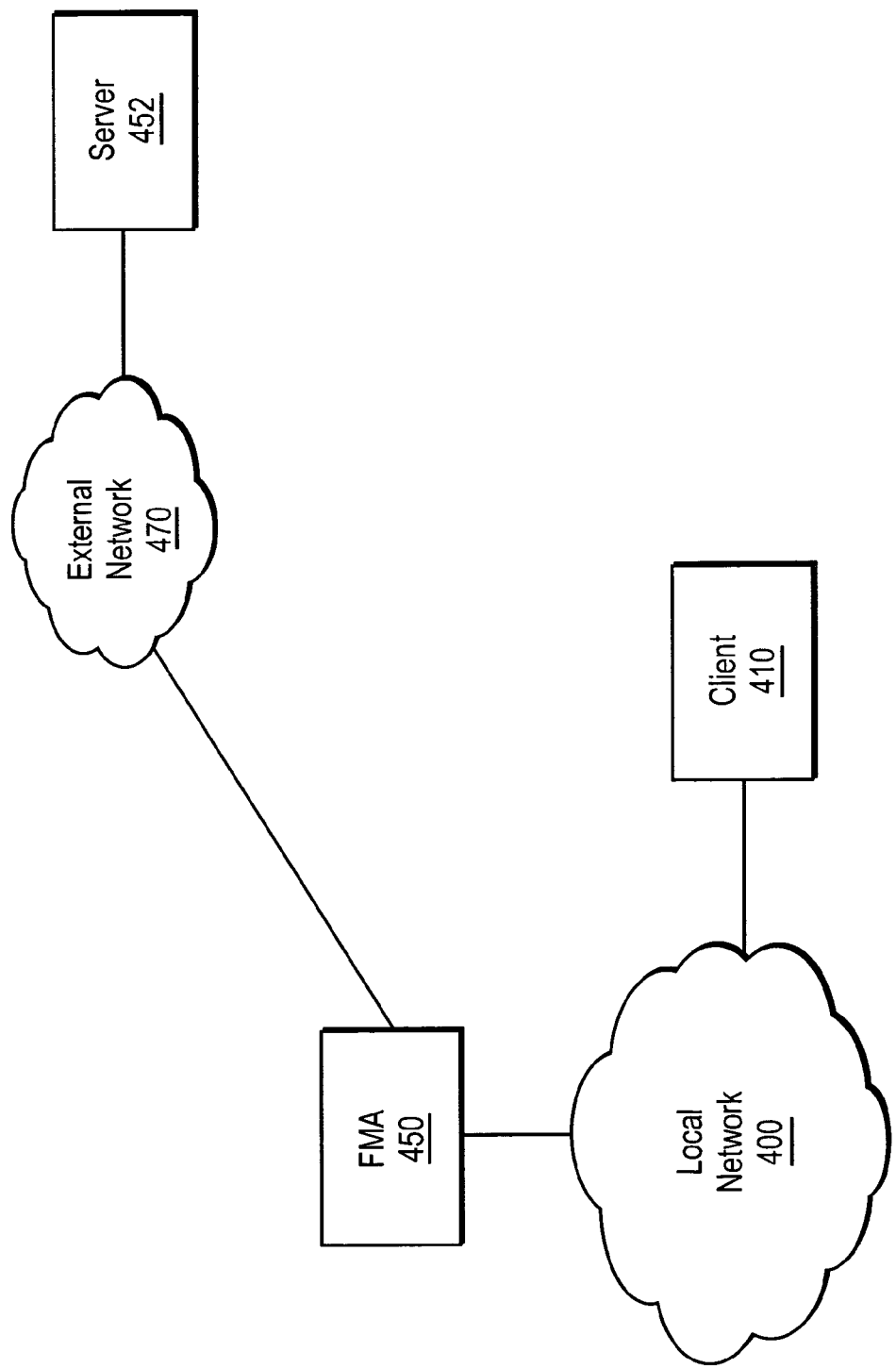
FIG. 4 is a block diagram illustrating one embodiment of an appliance host network for delivery of network-based applications to a client.

FIG. 4 is a block diagram illustrating one embodiment of an appliance host network for delivery of network-based applications to a client. Network 400 represents a local network such as, for example, a LAN, intranet, etc., whereas network 470 represents an external network such as, for example, the Internet. Remote server 452 is coupled to network 470 and represents a computing device configured to operate as an application server. Client device 410 is coupled to network 400 and represents a computing device configured to process data in conjunction with a requested network-based application program. FMA 450 is a file management appliance (described above) further equipped to function as a network-based application host. In one embodiment, FMA 450 functions as a dedicated server providing configuration services, document capture and indexing services, as well as network-based application delivery services to network 400. In one embodiment, FMA 450 functions as a delivery platform for network-based applications originating from remote server 452 and requested by client 410.

A variety of organizational arrangements are possible within the network-based application delivery scheme described herein. In one embodiment, remote server 452 may be controlled (e.g. managed) by one organization while client 410 is controlled by the same organization. More likely, however, is a situation where remote server 452 is controlled by a first organization while client 410 controlled by a second organization. Further still, FMA 450 may be controlled by either the first organization, the second organization, or even an independent third party organization. In one embodiment, network-based application licensing and royalty distribution is dependent upon the organization structure utilized.

In one embodiment, FMA 450 provides client 410 with access to an application based upon one or more access terms negotiated between the two organizations. The phrase "access terms" is used herein to describe one or more conditions according to which the client may be subjected in order to access a network-based application. "Access terms" include and/or are used synonymously with lease terms, license terms, usage terms and the like. The network-based application access terms may be negotiated "in person" between the two organizations, or alternatively the access terms may be negotiated automatically between FMA 450 and remote server 452. In any event, the negotiated terms may be incorporated within the network-based application and controlled by an access monitoring module that automatically verifies proper access privileges of the requesting device and grants access to the requested application based upon proper certification and/or authentication. In one embodiment, FMA 450 is responsible for monitoring and/or granting access to the one or more network-based applications.

In one embodiment, application access is based upon identification of the client, whereas in another embodiment, application access is based upon statistical data such as server load constraints and/or number of previous application executions. Under a client identification access scheme, the FMA may classify a client based upon its hardware and/or software configuration (i.e. architecture), or a unique identification code specific to the client. In one embodiment, the FMA automatically detects the client configuration and/or identification code through retrieval of a cookie stored on the client. In another embodiment, the client delivers its configuration and/or identification code to the FMA by way of a client-generated network packet. Additionally, access to one or more applications may be limited by a number of concurrent application executions as well as an upper bound on the number of times an application may be executed by the FMA. For example, one license agreement may stipulate access terms that limit a network-based application to 5 concurrent client accesses, whereas a second license agreement may stipulate application access terms that limit a network-based application to 5 total executions regardless of when they occur. The FMA may track client access privileges through the use of a simple lookup table for example, which may or may not be encrypted. Upon verifying that access to the client-requested network-based application is proper, client access to the application is enabled.

In yet another embodiment, network-based application access is based upon FMA identification. That is, network-based application access may be enabled for clients that operate only within a local network served by a specific FMA. For example, an organization may grant a license to an owner/operator of a specific FMA based upon the number of clients served by the FMA within the local network. Accordingly, the network-based application provider need not be concerned with individual client configurations. Rather, the onus is placed upon the operator of the FMA to ensure that client compatibility.

Figure 5:
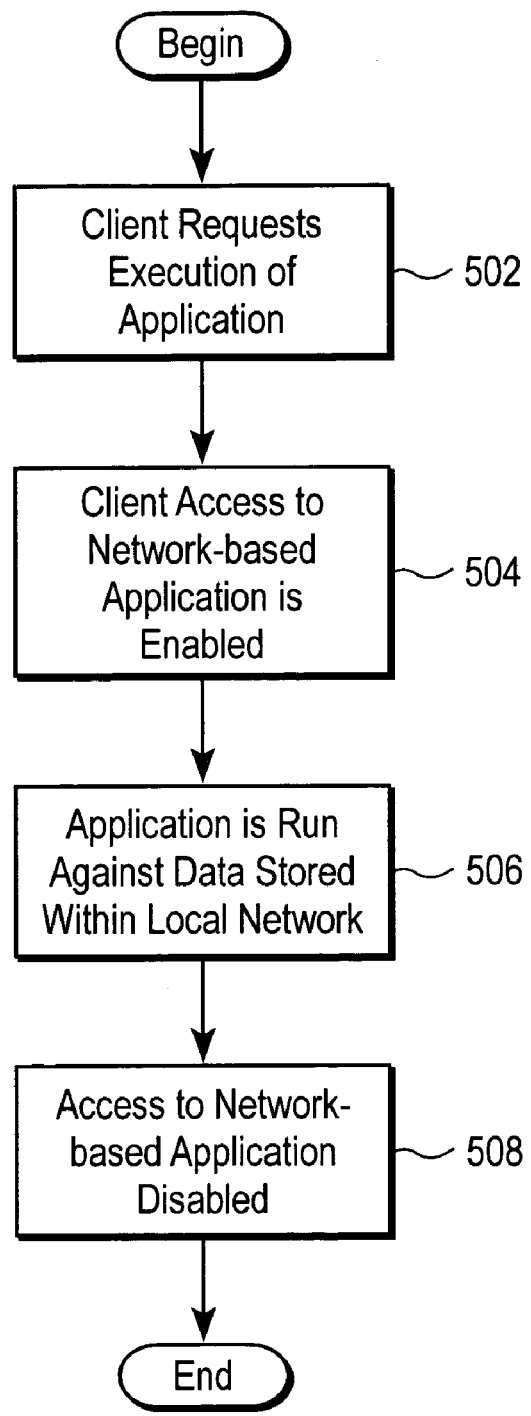
FIG. 5 is a flow diagram illustrating one embodiment of an appliance host operation.

FIG. 5 is a flow diagram illustrating one embodiment of an appliance host operation. A client request for execution of a specified network-based application is received by the appliance host, 502. In one embodiment, the appliance host determines if the client is authorized to access the requested network-based application based upon negotiated access terms. In another embodiment, the appliance host dynamically negotiates such access terms on behalf of the client. If the client is permitted access to the requested network-based application, the appliance host enables client access to the requested application, 504, and the network-based application is executed by the appliance host, 506. In one embodiment, execution of the network-based application is automatically triggered by software executing on a client rather than in response to a manual user-initiated request. For example, a user may be operating on a document displayed by a word-processing software package executing from an appliance host. If the document includes a spreadsheet, for example, the appliance host may automatically detect this and execute an application to display the spreadsheet. In another example, the displayed document and/or spreadsheet may include a URL which, when detected, will cause the appliance host to pro-actively execute a web browser in anticipation that the user may select the URL link. In one embodiment, the appliance host determines whether upgrades or version updates are available to one or more network-based applications requested by the client. Upon detecting available upgrades, the appliance host retrieves the data from the appropriate server(s) (possibly controlled by an independent organization) for use within the local network. Once client access to the requested network-based application is complete, whether determined by negotiated access terms or a signal from the client, the appliance host disables further client access to the application, 508. In one embodiment, network-based application disabling includes the appliance host deleting one or more versions of the application from the appliance host's memory. In another embodiment, network-based application disabling includes the appliance host merely restricting access by the subject client to the network-based application.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
an appliance host device for negotiating one or more access terms on behalf of a client device of a local network to access a network-based application stored upon the appliance host device, wherein usage of the network-based application is to be leased from a remote application server other than the client device and the appliance host device over an external network, wherein the appliance host device interfaces the client device of the local network with the remote application server of the external network, and wherein the remote application server also provides services to other clients of the external network other than the appliance host device; and
enabling access by the client device over the local network to the network-based application for execution by the appliance host device based upon the negotiated one or more access terms in response to a request by the client device.

2. The method of claim 1, wherein the one or more access terms are negotiated between the remote application server and the appliance host device.

3. The method of claim 1, further comprising:
operating the remote application server by a first organization;
operating the appliance host device by a second organization; and
negotiating the one or more access terms between the first organization and the second organization.

4. The method of claim 3, wherein the one or more negotiated access terms include an affirmation that the network-based application is to be executed only by the appliance host device within the local network specified by the one or more negotiated access terms.

5. The method of claim 1, wherein the one or more access terms include limitations on access distribution of the network-based application by the appliance host device within the local network.

6. The method of claim 1, further comprising:
dynamically updating the network-based application stored on the appliance host device based on interaction between the client device and the appliance host device.

7. The method of claim 6, wherein dynamically updating includes retrieving one or more network-based application modules from the remote application server over the external network.

8. The method of claim 6, wherein dynamically updating includes retrieving one or more network-based application modules from a third-party device over the external network.

9. The method of claim 1, further comprising:
disabling access by the client device to the network-based application in response to expiration of one or more negotiated lease terms.

10. The method of claim 9, wherein disabling access by the client device includes denying the client device access to the network-based application stored upon the appliance host device.

11. The method of claim 9, wherein disabling access by the client device includes removing the network-based application from the appliance host device such that further execution of the network-based application by the appliance host device is not possible.

12. A network comprising:
means for an appliance device for negotiating one or more access terms on behalf of a client device to access a network-based application stored upon the appliance host device, wherein usage of the network-based application is to be leased from a remote application server other than the client device and the appliance host device over an external network, wherein the appliance host device interfaces the client device of the local network with the remote application server of the external network, and wherein the remote application server also provides services to other clients of the external network other than the appliance host device; and means for enabling access by the client device to the network-based application for execution by the appliance host device based upon the negotiated one or more access terms in response to a request by the client device.

13. The network of claim 12, wherein the one or more access terms are negotiated between the remote application server and the appliance host device.

14. The network of claim 12, wherein the remote application server is operated by a first organization and the appliance host device is operated by a second organization, and wherein the one or more access terms are negotiated between the first organization and the second organization.

15. The network of claim 14, wherein the one or more negotiated access terms include an affirmation that the network-based application is to be executed only by the appliance host device within the local network specified by the one or more negotiated access terms.

16. The network of claim 12, wherein the one or more access terms include limitations on access distribution of the network-based application by the appliance host device within the local network.

17. The network of claim 12, further comprising:
means for dynamically updating the network-based application stored on the appliance host device based on interaction between the client device and the appliance host device.

18. The network of claim 17, wherein means for dynamically updating includes means for retrieving one or more network-based application modules from the remote application server over the external network.

19. The network of claim 17, wherein means for dynamically updating includes means for retrieving one or more network-based application modules from a third-party device over the external network.

20. The network of claim 12, further comprising:
means for disabling access by the client device to the network-based application in response to expiration of one or more negotiated lease terms.

21. The network of claim 20, wherein means for disabling access by the client device includes means for denying the client device access to the network-based application stored upon the appliance host device.

22. The network of claim 20, wherein means for disabling access by the client device includes means for removing the network-based application from the appliance host device such that further execution of the network-based application by the appliance host device is not possible.

23. An appliance host device comprising:
a storage medium having stored therein a plurality of machine executable programming instructions that, when executed, operate to:
negotiate one or more access terms on behalf of a client device to access a network-based application stored upon the appliance host device, wherein usage of the network-based application is to be leased from a remote application server other than the client device and the appliance host device over an external network, wherein the appliance host device interfaces the client device of the local network with the remote application server of the external network and wherein the remote application server also provides services to other clients of the external network other than the appliance host device, enable access by the client device to the network-based application, wherein the network-based application is to be executed by the appliance host device based upon the negotiated one or more access terms in response to a request by the client device; and a processor coupled to said storage medium to execute the programming instructions.

24. The appliance host device of claim 23, wherein the one or more access terms are negotiated between the remote application server and the appliance host device.

25. The appliance host device of claim 23, wherein the one or more negotiated access terms include an affirmation that the network-based application is to be executed only by the appliance host device within the local network specified by the one or more negotiated access terms.

26. The appliance host device of claim 23, wherein the one or more access terms include limitations on access distribution of the network-based application by the appliance host device within the local network.

27. The appliance host device of claim 23, further comprising programming instructions that, when executed, operate to:
dynamically update the network-based application stored on the appliance host device based on interaction between the client device and the appliance host device.

28. The appliance host device of claim 27, wherein the programming instructions that, when executed, operate to dynamically update includes programming instructions that, when executed, operate to retrieve one or more network-based application modules from the remote application server over the external network.

29. The appliance host device of claim 27, wherein the programming instructions that, when executed, operate to dynamically update, includes programming instructions that, when executed, operate to retrieve one or more network-based application modules from a third-party device over the external network.

30. The appliance host device of claim 23, further comprising programming instructions that, when executed, operate to:
disable access by the client device to the network-based application in response to expiration of one or more negotiated lease terms.

31. The appliance host device of claim 30, wherein the programming instructions that, when executed, operate to disable access by the client includes programming instructions that, when executed, operate to deny the client device access to the network-based application stored upon the appliance host device.

32. The appliance host device of claim 30, wherein the programming instructions that, when executed, operate to disable access by the client includes programming instructions that, when executed, operate to remove the network-based application from the appliance host device such that further execution of the network-based application by the appliance host device is not possible.

* * * * *